United States Patent [19]

Arcus

[11] Patent Number: 4,912,619
[45] Date of Patent: Mar. 27, 1990

[54] CIRCUIT FOR LIMITING INRUSH CURRENT DURING INITIAL TURN-ON OF A CLOCK-DERIVED POWER SUPPLY

[75] Inventor: Christopher G. Arcus, San Jose, Calif.
[73] Assignee: Ixys Corporation, San Jose, Calif.
[21] Appl. No.: 208,261
[22] Filed: Jun. 17, 1988
[51] Int. Cl.[4] ............................................ H02M 1/00
[52] U.S. Cl. ...................................... 363/49; 361/111
[58] Field of Search ............................ 363/49, 50, 87; 323/901, 908; 361/111

[56] References Cited

U.S. PATENT DOCUMENTS

| | | | |
|---|---|---|---|
| 3,935,527 | 1/1976 | Michelet et al. | 363/49 |
| 3,996,506 | 12/1976 | Kichak | 361/111 X |
| 4,439,806 | 3/1984 | Brajder | 363/50 X |
| 4,489,369 | 12/1984 | Ginsberg | 363/49 X |
| 4,510,422 | 4/1985 | Ogura | 363/49 X |
| 4,593,380 | 6/1986 | Kocher et al. | 364/900 |

Primary Examiner—Patrick R. Salce
Assistant Examiner—Kristine Peekman
Attorney, Agent, or Firm—Townsend and Townsend

[57] ABSTRACT

A current limiting circuit wherein a first transistor has an input terminal coupled to a power source, an output terminal coupled to a node which supplies current to the rest of the system, and a control terminal coupled to a source of clock pulses for flowing current from the power source into the node in response to the clock pulses. A second transistor has an input terminal coupled to the power source, an output terminal coupled to the node, and a control terminal coupled to the clock supply and to a current control signal circuit for flowing a second current into the node in response to the clock pulses when a prescribed current control signal is applied to the control terminal. The current which flows through the first transistor is significantly less than the current which flows through the second transistor. When the circuit is initially turned on, the small current flowing through the first transistor operates the system until such time as the large current from the second transistor may be added to it.

33 Claims, 3 Drawing Sheets

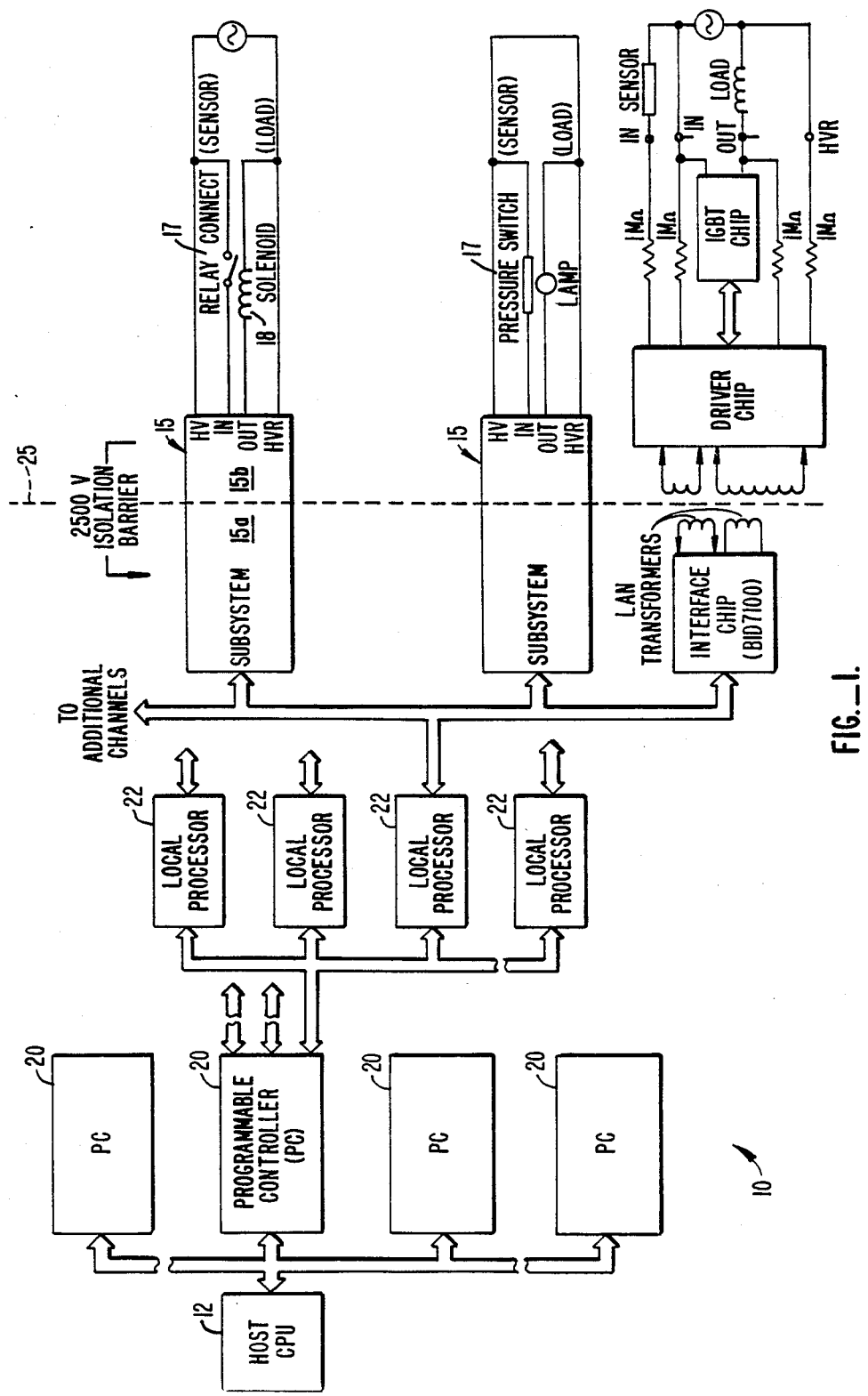
FIG._1.

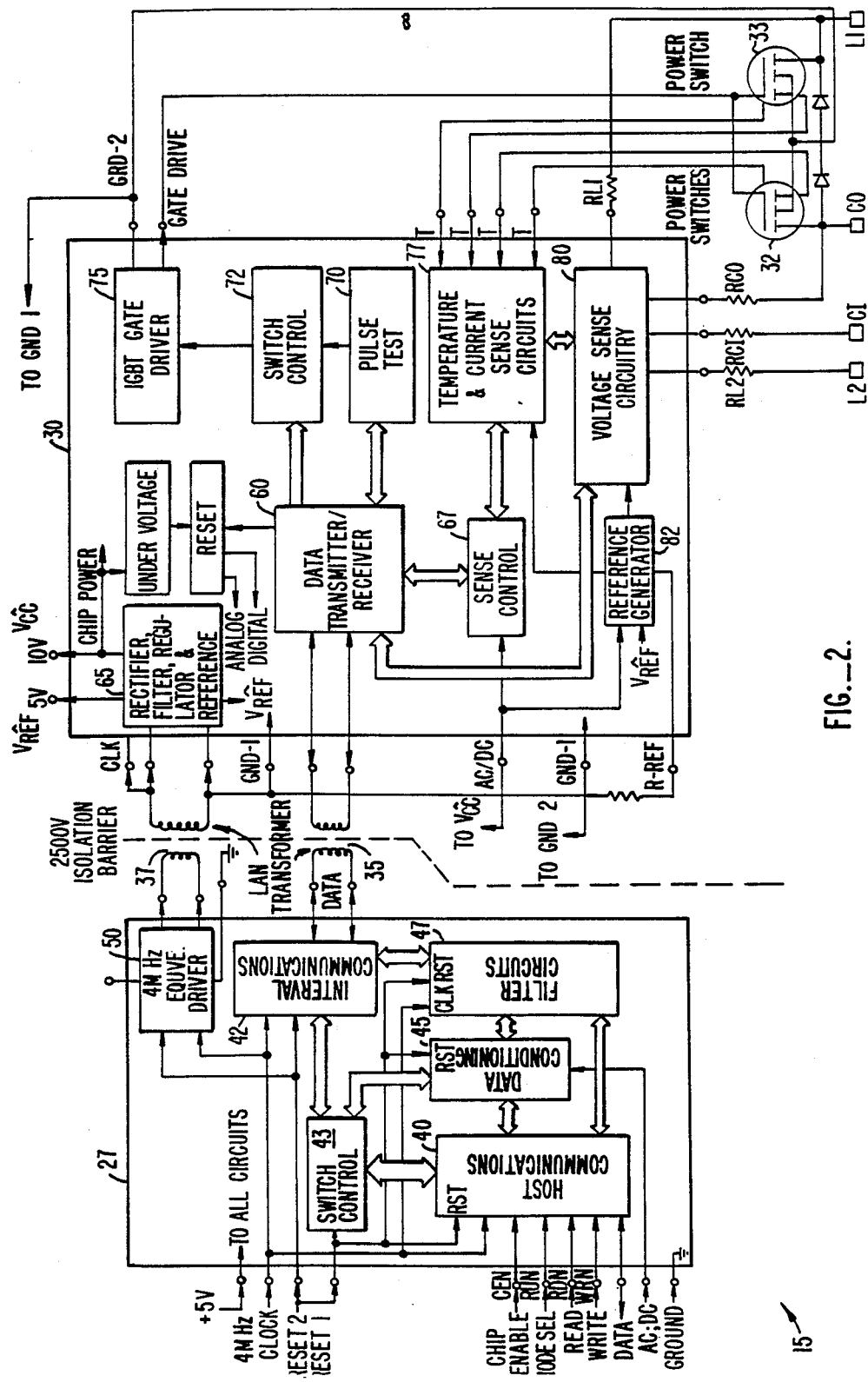
FIG._2.

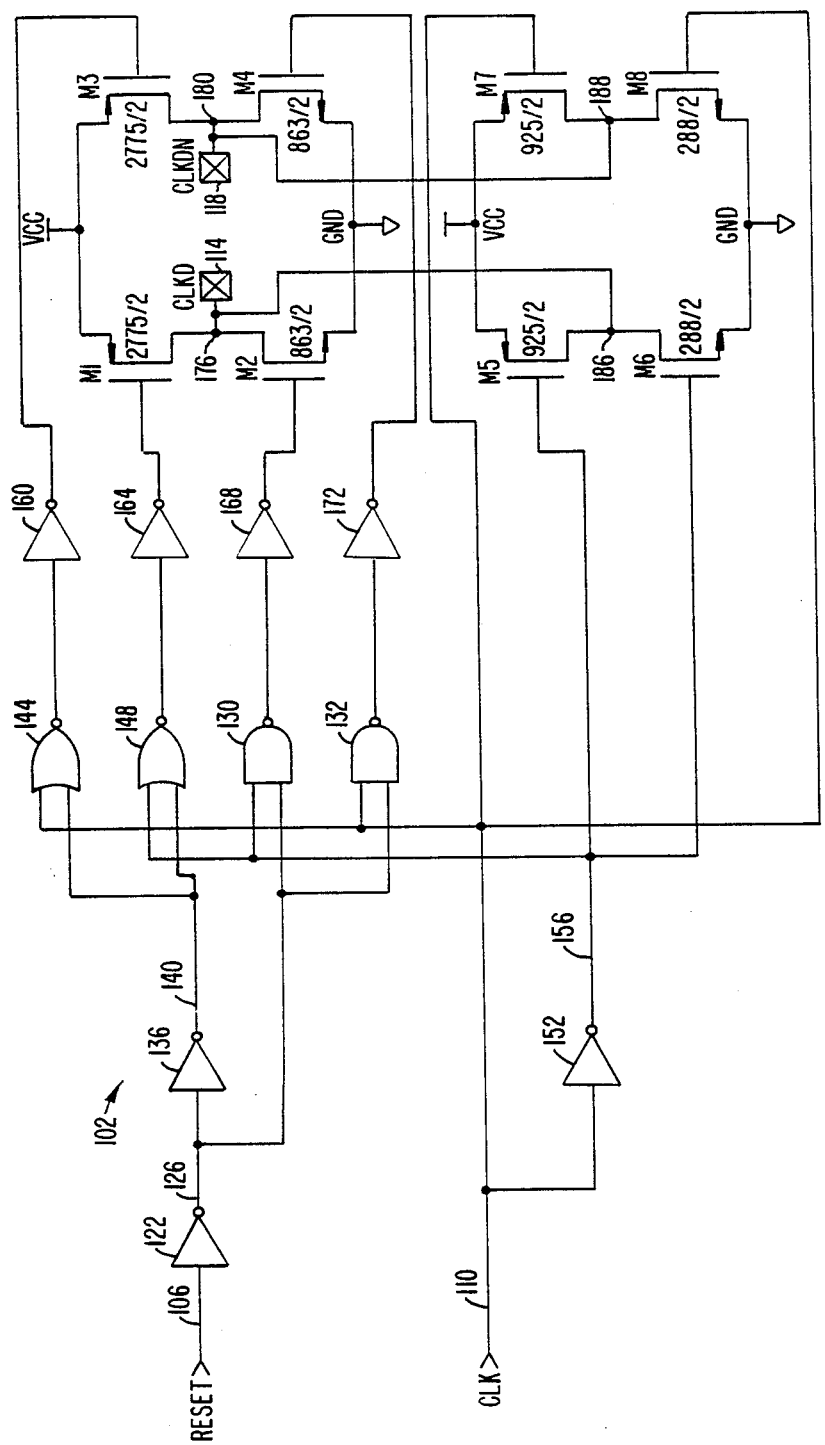
FIG._3.

CIRCUIT FOR LIMITING INRUSH CURRENT DURING INITIAL TURN-ON OF A CLOCK-DERIVED POWER SUPPLY

BACKGROUND OF THE INVENTION

1. Field Of The Invention

The invention relates generally to interface circuits for industrial automation systems and, more specifically, to a circuit for limiting inrush current through the system during initial turn-on of a clockderived power supply.

2. Description Of The Relevant Art

Reduced to bare essentials, an industrial process may be regarded as having a number of sensors and loads that correspond to input and output variables for a process control computer system. The sensors provide input values representative of the state of the process at a given time; the loads respond to output values, and thereby control various aspects of the process. Typical sensors include relay contacts, proximity switches, and pressure switches. Typical loads include contractor coils of starters for large motors, solenoid valves, relays, lamps, and small motors. A process may have several hundred to several thousand input sensors and loads that must be services at very frequent intervals.

A typical computer system for automating an industrial process contains a number of general and special purpose computers. The system monitors input variables from the process, performs suitable logical manipulations on the inputs, and updates output variables for the process. The computer system is usually organized hierarchically. A host processor, typically a minicomputer or a mainframe, communicates with a number of programmable controllers, each of which communicates with a number of power control subsystems through a number of local processors. A programmable controller is a processor especially designed to handle and perform logical manipulations on a large number of binary inputs on a cyclical basis. The local processors have as their primary function the efficient transfer of data between the power control subsystems and the working memories of the programmable controllers. The power control subsystems provide the interface between the local processors and the various sensors and loads.

A factory automation system, such as described above, must be provided with suitable electrical isolation between the local processor side of the system and the high voltages on the load side of the power control subsystems. The possibility of a short circuit between a motor running from any line voltage (DC or AC, single phase or more) and the programmable controller or local processor directing it, or worse yet the host processor, is horrible to contemplate—in terms of economic cost and danger to human life.

One example of electrical isolation between the local processor side of the system and the high voltages on the load side of the power control subsystems is disclosed in co-pending Application Ser. No. 208,157, filed on June 17, 1988. In that system, a transformer is used for isolation, with clock and data signals being transferred through the transformer from one side of the system to the other. The power for operating the electrical components on the load side of the power control subsystem is derived from the clock signals communicated across the transformer. As with other industrial automation systems, initial turn-on of the system causes a large inrush of current to the electrical components of the system. This shortens the life of the electrical components in the system and creates a risk of damage to them.

Conventional techniques for limiting inrush current include the use of transistors which are selectively turned off and on for variable lengths of time until the desired operating point of the system is reached. However, such systems require complex switching systems while still producing large currents for short periods of time. Thus, such systems do not actually limit the initial rush of current into the system. Furthermore, the current spikes caused by transistor switching generate noise in the system, and this affects reliability and accuracy of the system until the steady operating state is reached.

SUMMARY OF THE INVENTION

The present invention is directed to a circuit for limiting inrush current during initial turn-on of a clock-derived power supply, wherein small currents flow through the circuit during initial turn-on, and larger currents are switched in after it is safe to do so. The circuit provides continuous current flow and is configured for either AC or DC operation. Thus, initial current surges and switching noises are eliminated.

In one embodiment of the present invention, a first transistor has an input terminal coupled to a voltage source (VCC), and an output terminal coupled to a node which supplies current to the rest of the system. The control terminal of the first transistor is coupled to a source of clock pulses for flowing current from the voltage source into the node in response to the clock pulses. A second transistor has an input terminal coupled to the voltage source (VCC), an output terminal coupled to the node, and a control terminal coupled to the clock supply and to a current control signal circuit for flowing a second current into the node in response to the clock pulses when a prescribed current-control signal is applied to the control terminal.

The current which flows through the first transistor is significantly less than the current which flows through the second transistor. When the circuit is initially turned on, the small current flowing through the first transistor operates the system until such time as the large current from the second transistor may be added to it. To permit AC operation, a third transistor has its input terminal coupled to the node and its output terminal coupled to a current sink, such as a voltage source lower than VCC or ground. The third transistor has its control terminal coupled to the clock source, and flows current away from the node when the first and second transistors are inactive.

BRIEF DESCRIPTION OF THE DRAWINGS

FIG. 1 is a high level block diagram illustrating the hierarchical structure of a computer system for controlling an automated industrial process.

FIG. 2 is a detailed block diagram of a power control subsystem that interfaces the local processors to the drivers and sensors while providing electrical isolation.

FIG. 3 is a schematic diagram of a circuit for limiting inrush current during initial turn-on of the power control subsystem of FIG. 2.

DETAILED DESCRIPTION OF THE PREFERRED EMBODIMENT

The present invention is drawn to a circuit for limiting inrush current through a power control module during initial turn-on of a power supply. As an aid to understanding the environment in which the invention operates, a general description of a factory automation system will be set forth below.

OVERVIEW OF COMPUTER SYSTEM

FIG. 1 is a high level block diagram of a factory automation computer system. The system has a tree-like configuration with a host processor 12 (typically a mainframe) at the root and a large number of power control subsystems 15 (with associated sensors 17 and loads 18) at the ends of the branches. Host processor 12 and power control subsystems 15 are connected by a network of programmable controllers 20 and local processors 22. Programmable controllers 20 are special purpose processors optimized for performing logical manipulations on large numbers of binary variables. Each programmable controller communicates with a number (e.g., 8 or 16) of local processors, each of which communicates with a number (e.g., 8 or 16) of power control subsystems.

Each power control subsystem 15 includes a system-side portion 15a and a load-side portion 15b that communicates across a 2500-volt isolation barrier 25. During operation, signals from the local processor continuously update the command to apply power to, or remove it from, the load. Likewise, diagnostic data from the sensor is continuously communicated to the local processor.

OVERVIEW OF POWER CONTROL SUBSYSTEM

FIG. 2 is a detailed block diagram of one of power control subsystems 15. In a preferred implementation, subsystem 15 comprises a pair of CMOS chips, referred to as system interface chip 27 and load interface chip 30, a pair of MOS power switching devices 32 and 33, one or two isolation transformers, referred to as data transformer 35 and clock transformer 37, and a small number of other discrete components.

System interface chip 27 is a 5-volt CMOS chip which operates on the controller/processor/system side of isolation barrier 25, and it communicates with the host system. Pinout connections include DATA, AC/DC, WRITE, READ, RUN/PGM, CHIP ENABLE, RESET, and CLOCK, as well as terminals for the transformers and voltage and ground terminals. System interface chip 27 includes host communication circuitry 40, internal communications circuitry 42, switch control circuitry 43, data conditioning circuitry 45, filter circuits 47, and a clock driver 50.

Host communications circuitry 40 provides a bidirectional serial communication link on the DATA line with a protocol easily implemented by most microprocessors. During normal operation, with the RUN/PGM high and CHIP ENABLE low, the host communication circuitry receives a 3-bit serial command word on the DATA line. Pulses on the WRITE line clock the data bits into the chip providing a handshake. The data words are analyzed and, if their pattern or number of bits is incorrect, the data is rejected and the host informed. Similarly, 8-bit status words are transmitted to the host when appropriate handshake clock pulses appear on the READ line. In the programming mode, with RUN/$\overline{\text{PGM}}$ low, 7-bit serial words are transmitted to chip 27 to set the subsystem's default conditions, sense input's set points, and filter time constants, and verification words are returned to the local processor.

Internal communications circuitry 42 is responsible for communicating data across the isolation barrier to load interface chip 30. The link with the load interface chip is via data transformer 35, using Manchester encoding. Internal communications circuitry 42 encodes checked and processed data received from the host, adds a parity bit, and sends the data at 600 Kilobaud to data transformer 35, and hence across the barrier.

Clock driver 50 derives its timing from the CLOCK input (e.g., 4 MHz) and communicates a version of this signal to clock transformer 37, and hence to load interface chip 30. As will be discussed below, the clock signal which is transmitted across clock transformer 37 provides both a clock signal and power to load interface chip 30.

Load interface chip 30 is an 18-volt CMOS chip which operates in conjunction with a pair of MOS switching devices 32 and 33. These are preferably insulated gate bipolar transistors (IGBT's) which, while slower than power MOSFET's, are more rugged and less expensive for a given current carrying capability. Two IGBT's are used for controlling AC power, while only one IGBT is needed for controlling DC power. The load interface chip includes data transmitting-/receiving circuitry 60, power circuitry 65, sense control circuitry 67, pulse test circuitry 70, switch control circuitry 72, an IGBT gate driver 75, temperature and current sense circuitry 77, voltage sense circuitry 80, and a voltage reference generator 82.

Data transmitting/receiving circuitry 60 is coupled to the secondary side of data transformer 35 to provide the basic data communication across the isolation barrier. It decodes the incoming data signals, but checks parity before latching. Each byte is transmitted at least twice. Each incoming byte is compared with its predecessor, and its structure is checked for compliance with the Manchester encoding scheme. Similar checking occurs in the reverse direction. Watchdog timers on both chips 27 and 30 alert the subsystem to communication link failure, and put it in a programmed default condition.

Power circuitry 65 is coupled to the secondary of clock transformer 37, and includes on-chip rectifiers, filters, regulators, and references to provide power to the remaining portions of the chip. The 5-volt signal from clock driver 50 on chip 27 is stepped up by clock transformer 37 to a 13–14 volt peak-to-peak waveform. This is rectified and used to develop a 10-volt supply voltage for chip 30 and a 5-volt reference (via a voltage reference generator 82) to set the trip points for current and voltage sensing circuitry 77 and 80. Power circuitry 65 also includes a circuit for limiting inrush current during initial turn-on of the power supply.

Switch control circuitry 72 and IGBT gate driver 75 control the gates on the IGBT's. Switch control circuitry 72 is preprogrammed to call for "switch open," "switch closed," or "no change" when the subsystem goes into a default condition. Gate driver 75 can handle capacitive loads up to 5000 pf.

Temperature and current sense circuitry 77 provides signals from temperature sensing diodes and current mirrors on the IGBT's. The current sense trip point can be programmed, but the temperature trip point is fixed.

When the permissible die temperature or maximum selected current of either switch is exceeded, it is turned off within two microseconds and the host notified. Temperature and current sense circuitry 77 has the ability to accurately sense currents less than 50 μA, as well as large currents of 40A or more.

Four lines, designated LI, CO, CI, and L2, connect chip 30 and the IGBT's to the load and high voltage line. LI ties the line to one side of the IGBT switch, and CO ties the other side of the IGBT switch to the load. CI connects to the contact of the device sensing load status and through it, if closed, to the line. L2 connects to the low side of the line (e.g., AC common). Four 1-megohm resistors link the four lines to corresponding inputs on voltage sense circuitry 80 where they provide the load status sense inputs. Current difference circuitry in the voltage sense circuitry 80 senses line voltage, customer input voltage, and customer output voltage.

CURRENT LIMITING CIRCUIT

To limit inrush current during initial turn-on of load interface chip 30, power circuitry 65 includes the current-limiting circuit 102 shown in FIG. 3. Circuit 102 receives reset signals over a reset line 106 and clock signals over a CLK line 110. Circuit 102 provides current to the rest of the system through a CLKD node 114 and a CLKDN node 118.

The reset signals received on reset line 106 function as current-control signals and are communicated to the input terminal of an inverter 122. The output terminal of inverter 122 is connected to a line 126 which, in turn, is connected to input terminals of NAND gates 130 and 132 and to the input terminal of an inverter 136. The output terminal of inverter 136 is connected to a line 140, which, in turn, is connected to input terminals of NOR gates 144 and 148.

The signals on clock line 110 are communicated to the other input terminals of NOR gate 144 and NAND gate 132. Clock line 110 also is connected to the gate of a PMOS transistor M7, to the gate of an NMOS transistor M8, and to an input terminal of an inverter 152. The output terminal of inverter 152 is coupled to a line 156 which, in turn, is connected to the other input teminals of NOR gate 148 and NAND gate 130. Line 156 also is coupled to the gate of a PMOS transistor M5 and to the gate of an NMOS transistor M6.

The output terminals of NOR gates 144 and 148 are connected to the input terminals of inverters 160 and 164, respectively. Similarly, the output terminals of NAND gates 130 and 132 are connected to the input terminals of inverters 168 and 172. The output terminal of inverter 160 is coupled to the gate of a PMOS transistor M3, the output terminal of inverter 164 is coupled to the gate of a PMOS transistor M1, the output terminal of inverter 168 is coupled to the gate of an NMOS transistor M2, and the output terminal of inverter 172 is coupled to the gate of an NMOS transistor M4.

The source terminals of transistors M1 and M3 are coupled to a voltage source VCC, and their drain terminals are coupled to the drain terminals of transistors M2 and M4, respectively. CLKD node 114 is connected to a node 176 between the drain terminals of transistors M1 and M2, whereas CLKDN node 118 is coupled to a node 180 between the drains of transistors M3 and M4. The source terminals of transistors M2 and M4 are coupled to a ground potential. Likewise, the sources of transistors M5 and M7 are coupled to a voltage source VCC, and the drain terminals of transistors M5 and M7 are coupled to the drain terminals of transistors M6 and M8, respectively. CLKD node 114 is coupled to a node 186 between the drain terminals of transistors M5 and M6, and CLKDN node 118 is coupled to a node 188 between the drain terminals of transistors M7 and M8. The source terminals of transistors M6 and M8 are coupled to a ground potential.

For a detailed explanation of how transistors M1-M8 operate in response to various signals applied to reset line 106 and clock line 110, see Table 1.

TABLE 1

| RESET | CLK | M1 | M2 | M3 | M4 | M5 | M6 | M7 | M8 |
|---|---|---|---|---|---|---|---|---|---|
| 0 | 0 | Off | On | On | Off | Off | On | On | Off |
| 0 | 1 | On | Off | Off | On | On | Off | Off | On |
| 1 | 0 | Off | Off | Off | Off | Off | On | On | Off |
| 1 | 1 | Off | Off | Off | Off | On | Off | Off | On |

As shown in Table 1, when a high signal is applied to reset line 106, transistors M1-M4 are off at all times. Thus, the only currents flowing to CLKD node 114 and CLKDN node 118 are those which flow through transistors M5-M8. For example, when a high signal is received on clock line 110, current flows from VCC through transistor M5 and to CLKD node 114, and current flows from CLKDN node 118 through transistor M8 to ground. On the other hand, when a low signal is applied to reset line 106, then, in addition to the current flowing through the aforementioned transistors, current also flows from VCC through transistor M1 to CLKD node 114, and from CLKDN node 118, through transistor M4 to ground.

When a low clock signal is applied to clock line 110, current is drawn from CLKD node 114 through transistors M2 and/or M6, and current flows into CLKDN node 118 through transistors M3 and/or M7. Thus, current-limiting circuit 102 is configured for essentially continuous operation to minimize switching transients and to allow for AC operation.

In this embodiment, transistors M1-M4 are relatively large compared to corresponding transistors M5-M8. Upon initial operation of the system, a high signal is applied to reset line 106 and current is limited by the small values of transistors M5, M6, M7, and M8. When the system has reached a safe operating state, a low signal then may be applied to reset line 106, and the large value transistors M1, M2, M3, and M4 conduct for allowing full current flow to and from CLKD node 114 and CLKDN node, respectively.

While the above is a complete description of a preferred embodiment of the present invention, various modifications may be employed. Consequently, the scope of the invention should not be limited except as described in the claims.

I claim:

1. A circuit for limiting inrush current during initial turn-on of a clock-derived power supply comprising:
   clock signal means for receiving clock signals;
   current control signal means for receiving a current control signal;
   first current flowing means, coupled to the clock signal means, for coupling a first current to a node in response to the clock signals;
   second current flowing means, coupled to the clock signal means and to the current control signal means, for coupling a second current to the node in response to the clock signals when a prescribed current control signal is received, the first current being combined at the node with the second current to create a combined current.

2. The circuit according to claim 1 wherein the first current flows into the node.

3. The circuit according to claim 2 wherein the second current flows into the node.

4. The circuit according to claim 1 wherein the combined current is greater than the first current.

5. The circuit according to claim 4 wherein the clock signals comprise periodic high and low signals, and wherein the first current flowing means comprises a first transistor having a control terminal coupled to the clock signal means, an input terminal coupled to a power source, and an output terminal coupled to the node, the first transistor flowing current from the power source into the node in response to a selected one of the high or low signals.

6. The circuit according to claim 5 wherein the second current flowing means comprises a second transistor having a control terminal coupled to the clock signal means and to the current control signal means, an input terminal coupled to the power source, and an output terminal coupled to the node, the second transistor flowing current from the power source into the node in response to the selected one of the high or low signals when the prescribed current control signal is received.

7. The circuit according to claim 6 wherein the second current is greater than the first current.

8. The circuit according to claim 7 wherein the first current flowing means comprises a single first transistor and the second current flowing means comprises a single second transistor.

9. The circuit according to claim 6 wherein the first and second transistors flow current into the node only during high clock signals.

10. The circuit according to claim 9 further comprising continuous current means, coupled to the clock signal means, to the power source and to the node, for coupling current to the node when the first and second transistors are not coupling current to the node.

11. The circuit according to claim 10 wherein the continuous current means comprises a third transistor having a control terminal coupled to the clock signal means, an input terminal coupled to the node, and an output terminal coupled to a power sink, the third transistor flowing a third current from the node into the power sink in response to the clock signal opposite the selected clock signal.

12. The circuit according to claim 11 wherein the continuous current means further comprises a fourth transistor having a control terminal coupled to the clock signal means and to the current control signal means, an input terminal coupled to the node, and an output terminal coupled to the power sink, the fourth transistor flowing a fourth current from the node into the power sink in response to the clock signal opposite the selected clock signal when the prescribed current control signal is received.

13. The circuit according to claim 1 wherein the first current flows away from the node.

14. The circuit according to claim 13 wherein the second current flows away from the node.

15. The circuit according to claim 13 wherein the clock signals comprise periodic high and low signals, and wherein the first current flowing means comprises a first transistor having a control terminal coupled to the clock signal means, an input terminal coupled to the node, and an output terminal coupled to a power sink, the first transistor flowing current from the node into the power sink in response to a selected one of the high or low clock signals.

16. The circuit according to claim 15 wherein the second current flowing means comprises a second transistor having a control terminal coupled to the clock signal means and to the current control signal means, an input terminal coupled to the node, and an output terminal coupled to the power sink, the second transistor flowing current from the node into the power sink in response to the selected one of the high or low clock signals when the prescribed current control signal is received.

17. The circuit according to claim 16 wherein the second current is greater than the first current.

18. The circuit according to claim 17 further comprising continuous current means, coupled to the clock signal means, to a power source, and to the node, for coupling current to the node when the first and second transistors are not coupling current to the node.

19. The circuit according to claim 18 wherein the continuous current means comprises a third transistor having a control terminal coupled to the clock signal means, an input terminal coupled to the power source, and an output terminal coupled to the node, the third transistor flowing a third current from the power source into the node in response to the clock signal opposite the selected clock signal.

20. A circuit for limiting inrush current during initial turn-on of a clock-derived power supply comprising:
   clock signal means for receiving periodic high and low clock signals;
   current control signals means for receiving a current control signal;
   first current flowing means, coupled to the clock signal means, for coupling a first current to a first node in response to a selected one of the high or low clock signals;
   second current flowing means, coupled to the clock signal means and to the current control signal means, for coupling a second current to the first node in response to a selected one of the high or low clock signals when a prescribed current control signal is received, the first and second currents being combined at the first node;
   third current flowing means, coupled to the clock signal means, for coupling a third current to a second node in response to the clock signal opposite the selected high or low clock signal; and
   fourth current flowing means, coupled to the clock signal means and to the current control signal means, for coupling a fourth current to the second node in response to the clock signal opposite the high or low clock signal when a prescribed current control signal is received, the third and fourth currents being combined at the second node.

21. The circuit according to claim 20 wherein the first current flowing means comprises a first transistor having a control terminal coupled to the clock signal means, an input terminal coupled to a power source, and an output terminal coupled to the first node.

22. The circuit according to claim 21 wherein the second current flowing means comprises a second transistor having a control terminal coupled to the clock signal means and to the current control signal means, an input terminal coupled to the power source, and an output terminal coupled to the first node.

23. The circuit according to claim 22 wherein the third current flowing means comprises a third transistor having a control terminal coupled to the clock signal means, an input terminal coupled to the power source, and an output terminal coupled to the second node.

24. The circuit according to claim 23 wherein the fourth current flowing means comprises a fourth transistor having a control terminal coupled to the clock signal means and to the current control signal means, an input terminal coupled to the power source, and an output terminal coupled to the second node.

25. The circuit according to claim 24 wherein the first and second transistors flow current into the first node only during the selected high or low clock signal, and wherein the third and fourth transistors flow current into the second node only during the clock signal opposite the selected high or low clock signal.

26. The circuit according to claim 25 further comprising continuous current means, coupled to the clock signal means, to the power source, and to the first and second nodes, for coupling current to the first node when the first and second transistors are not coupling current into the first node, and for flowing current to the second node when the third and fourth transistors are not flowing current into the second node.

27. The circuit according to claim 26 wherein the continuous current means comprises:
a fifth transistor having a control terminal coupled to the clock signal means, an input terminal coupled to the first node, and an output terminal coupled to a power sink, the fifth transistor flowing a fifth current from the first node into the power sink in response to the clock signal opposite the selected high or low clock signal; and
a sixth transistor having a control terminal coupled to the clock signal means, an input terminal coupled to the second node, and an output terminal coupled to a power sink, the sixth transistor flowing a sixth current from the second node into the power sink in response to the selected high or low clock signal.

28. The circuit according to claim 27 wherein the continuous current means further comprises:
a seventh transistor having a control terminal coupled to the clock signal means and to the current control signal means, an input terminal coupled to the first node, and an output terminal coupled to the power sink, the seventh transistor flowing a seventh current from the first node into the power sink in response to the clock signal opposite the selected high or low clock signal when the prescribed current control signal is received; and
an eighth transistor having a control terminal coupled to the clock signal means and to the current control signal means, an input terminal coupled to the second node, and an output terminal coupled to the power sink, the eighth transistor flowing an eighth current from the second node into the power sink in response to the selected high or low clock signal when the prescribed current control signal is received.

29. The circuit according to claim 20 further comprising:
fifth current flowing means, coupled to the clock signal means and to the first node, for coupling a fifth current to the first node in response to the clock signal opposite the selected high or low clock signal; and
sixth current flowing means, coupled to the clock signal means and to the second node, for coupling a sixth current to the second node in response to the selected high or low clock signal.

30. The circuit according to claim 29 wherein the first and second current flowing means flow current into the first node, and the third and fourth current flowing means flow current into the second node.

31. The circuit according to claim 30 wherein the fifth current flowing means flows current away from the first node, and the sixth current flowing means flows current away from the second node.

32. The circuit according to claim 29 wherein the first and second current flowing means flow current away from the first node, and the third and fourth current flowing means flow current away from the second node.

33. The circuit according to claim 32 wherein the fifth current flowing means flows current into the first node, and the sixth current flowing means flows current into the second node.

* * * * *